Figure 1:
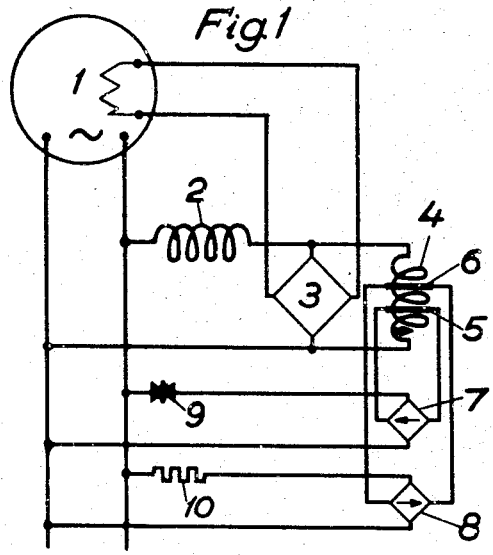

Aug. 2, 1949.  U. KRABBE  2,477,988

VOLTAGE REGULATOR FOR ALTERNATING CURRENT MACHINES

Filed Aug. 21, 1947

INVENTOR
ULRIK KRABBE
By James Aiken
ATTORNEY

Patented Aug. 2, 1949

2,477,988

UNITED STATES PATENT OFFICE 2,477,988

VOLTAGE REGULATOR FOR ALTERNATING CURRENT MACHINES

Ulrik Krabbe, Fruens Boge, Denmark, assignor to Allmänna Svenska Elektriska Aktiebolaget, Vasteras, Sweden, a Swedish corporation Application August 21, 1947, Serial No. 769,777
In Sweden August 27, 1946

2 Claims. (Cl. 322—28)

The object of the present invention is a voltage regulator for alternating current machines of the type in which a rectified current from the alternating current side of the machine controlled by a direct current saturable reactor, is directly introduced into its exciting winding. The most simple and obvious connection then would seem to be to connect the saturable reactor directly in series with the exciting rectifier and to control the said reactor by voltage responsive and comparing members. Experiments have shown, however, that such a regulator has bad dynamic properties, essentially depending on the magnetic inertia of the saturable reactor which, at a sudden alteration of the machine voltage, makes it initially absorb an essentially constant voltage and therefore temporarily leave the major portion of the alteration to the exciting winding, the current of which is therefore temporarily altered in the opposite direction to the desirable one. According to the present invention, therefore, a direct current directly controlled by a direct current saturable reactor is caused to oppose the excitation. This can be accomplished in different ways. One simple method is to connect a saturable reactor controlled by the voltage to be regulated, in a shunt to the exciting current. The current dividing into the exciting current and the reactor current then may be derived from the machine voltage across an essentially inductive impedance. At a sudden variation of the machine voltage, the saturable reactor, which as a rule is self-magnetized, will then retain a substantially constant voltage, whence it could be assumed that the exciting current would remain constant, which certainly would involve an essential improvement over the direct reactor control which as aforesaid involves a temporary variation in the wrong direction. Experiments have proved, however, that the exciting current already at the first instant is varied in the right direction at a variation of the voltage. This may for instance depend on an imperfection of the saturable reactor and on circumstances which will be more fully explained in the following detailed description.

The expression "directly controlled by a direct current saturable reactor" implies in this specification not only that the controlled current shall vary in the same direction as that controlling the saturation of the reactor but also that no separate energy source, as a generator or the like, shall be interposed between the controlling reactor and the element influenced by the current. On the other hand, the expression does not exclude the interposing of a non energy-delivering apparatus, for instance a transformer, between the saturable reactor and the element influenced by the controlled current.

Figure 2:
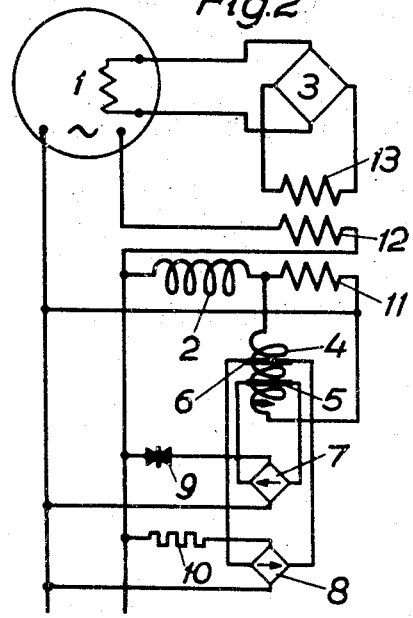

In the accompanying drawing, Figs. 1 and 2 show diagrammatically two forms of the invention.

In Fig. 1, 1 is an alternating current machine, which for the sake of simplicity if shown as single-phase, although as a rule it is threephase. Between its terminals, an inductance 2 is connected in series with a rectifier 3, the direct current terminals of which are connected to the exciting winding of the machine. In parallel to the alternating current terminals of the rectifier 3, there is connected a direct current saturable reactor 4 with so-called internal self-magnetisation which may be supplemented by an external self-magnetisation, and in the example shown having two external direct current windings 5 and 6. These windings are connected, across rectifiers 7 and 8 and impedances 9 and 10 having essentially different characteristics, to the alternating current voltage terminals of the machine. The winding 5 which is connected across an impedance 9 of such a character, that its current rises much more rapidly than the machine voltage, acts in the same direction as the self-magnetisation, while the winding 6, which is connected across an impedance with an essentially rectilinear characteristic, acts in the opposite direction.

The regulator now described operates substantially in the following manner. Without the saturable reactor 4, the rectifier 3 would give an excitation substantially proportional to the voltage, but the said reactor shunts off a larger or smaller portion of the current from the rectifier 3 so as to effect a regulation. At normal voltage, the two direct current windings 5 and 6 keep each other in equilibrium, so that the reactor will admit a current of normal value. If the voltage for instance rises above its normal value, the winding 5 connected across the impedance 9 will be predominant, so that the current through the saturable reactor rises rapidly and the exciting current is thus reduced. When the voltage sinks, a corresponding increase of current is obtained.

At the first instant of a regulating procedure, for instance at a voltage rise on the machine, the reactor 4 has certainly a tendency to keep the voltage across its alternating current terminals constant and thereby also the voltage across the exciting winding, but this tendency is counteracted by the fact, that the current through the saturable reactor rises more rapidly than the total current through the inductance 2, and the consequence will be, as shown by experiments, an instantaneous reduction of the exciting current, which initiates the somewhat slower adjustment of the said current to the necessary lower value. It contributes also to the said instantaneous action, that the phase of the saturable reactor current lies more close to that of the total current than that of the exciting current, which on account of the rectifying obtains an ohmic character, while the saturable reactor current is substantially inductive.

If, in Fig. 1, it is desired to introduce a current dependent exciting component (compounding), this may be done in the simplest way by directly introducing the current from one or more current transformers between the alternating current terminals of the rectifier 3 or by means of separate rectifiers directly into the exciting winding.

Fig. 2 differs from Fig. 1 substantially in that a compounding device is shown, and in that the compounding as well as the voltage influences the exciting rectifier 3 across a series transformer. This transformer has three windings, one 11 of which is traversed in parallel with the reactor 4 by the current derived from the machine voltage across an inductance 2, another 12 is traversed by the machine current, and a third one 13 feeds the rectifier 3. The reactor 4 is arranged in the same way as in Fig. 1 and the manner of operation is, apart from the compounding, essentially identical to that of the connection according to Fig. 1.

When the machine is short-circuited, the compounding members, if such are present, deliver alone the exciting current, and they should then be so dimensioned as to give a sufficient excitation.

I claim as my invention:

1. A voltage regulator comprising an alternating current machine, an exciting winding therefor, a circuit connected between alternating current terminals of said machine, a direct current saturable reactor controlled by the voltage of said machine and absorbing a portion of the current flowing in said circuit, a rectifier connected on the alternating current side to be fed by another portion of the current in said circuit and on the direct current side to feed said exciting winding, and means independent of said reactor for introducing an exciting current substantially proportional to the load current of said machine in parallel to the current derived from said alternating current terminals across said rectifier.

2. A voltage regulator as claimed in claim 1, in which the current derived from said alternating current terminals and the current substantially proportional to the load current of said machine traverse different primary windings of a common transformer, a secondary winding of said transformer being connected to feed said rectifier.

ULRIK KRABBE.

REFERENCES CITED

The following references are of record in the file of this patent:

UNITED STATES PATENTS

| Number | Name | Date |
| --- | --- | --- |
| 1,710,755 | West | Apr. 30, 1929 |